Patented Apr. 16, 1935

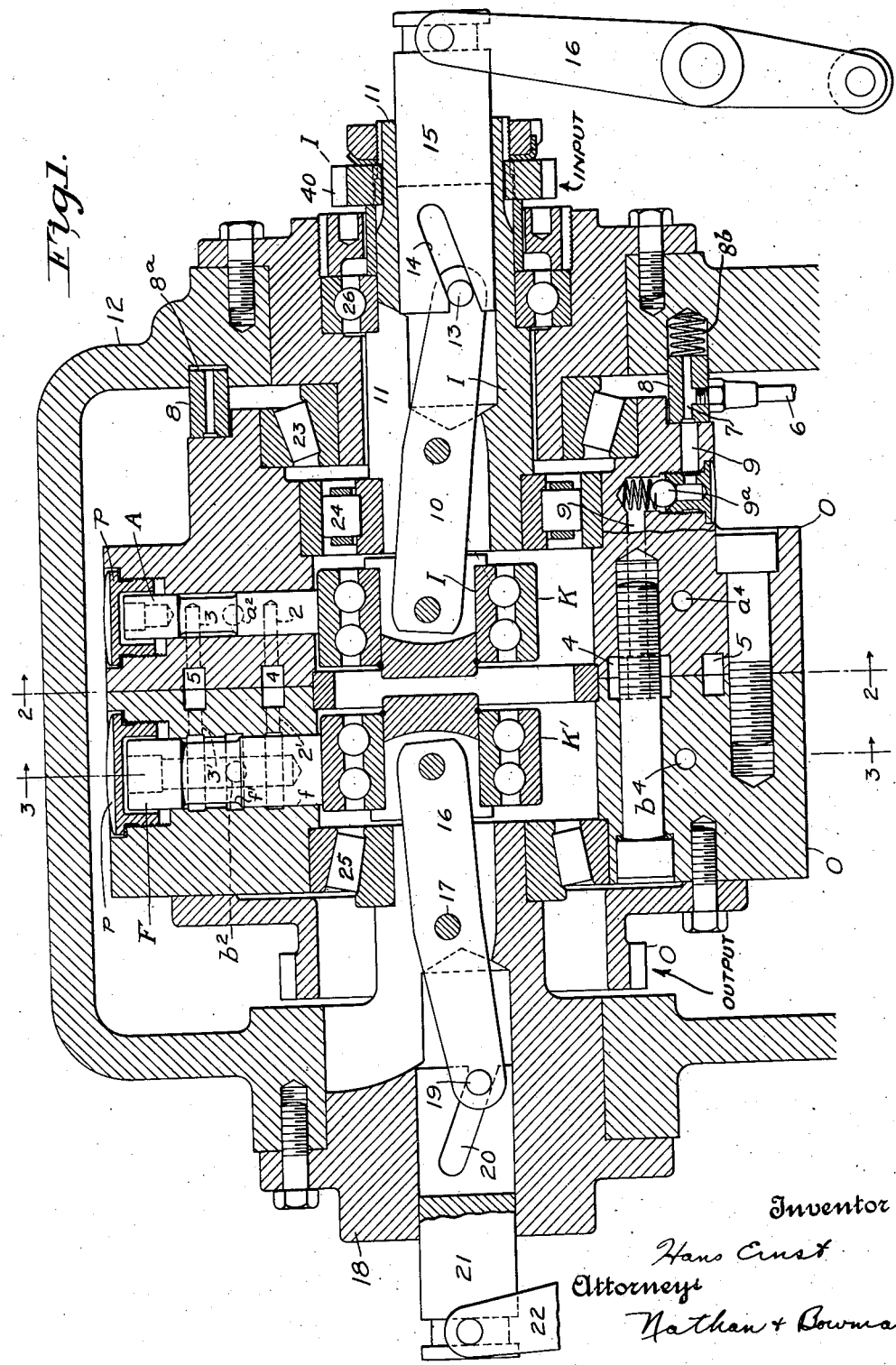

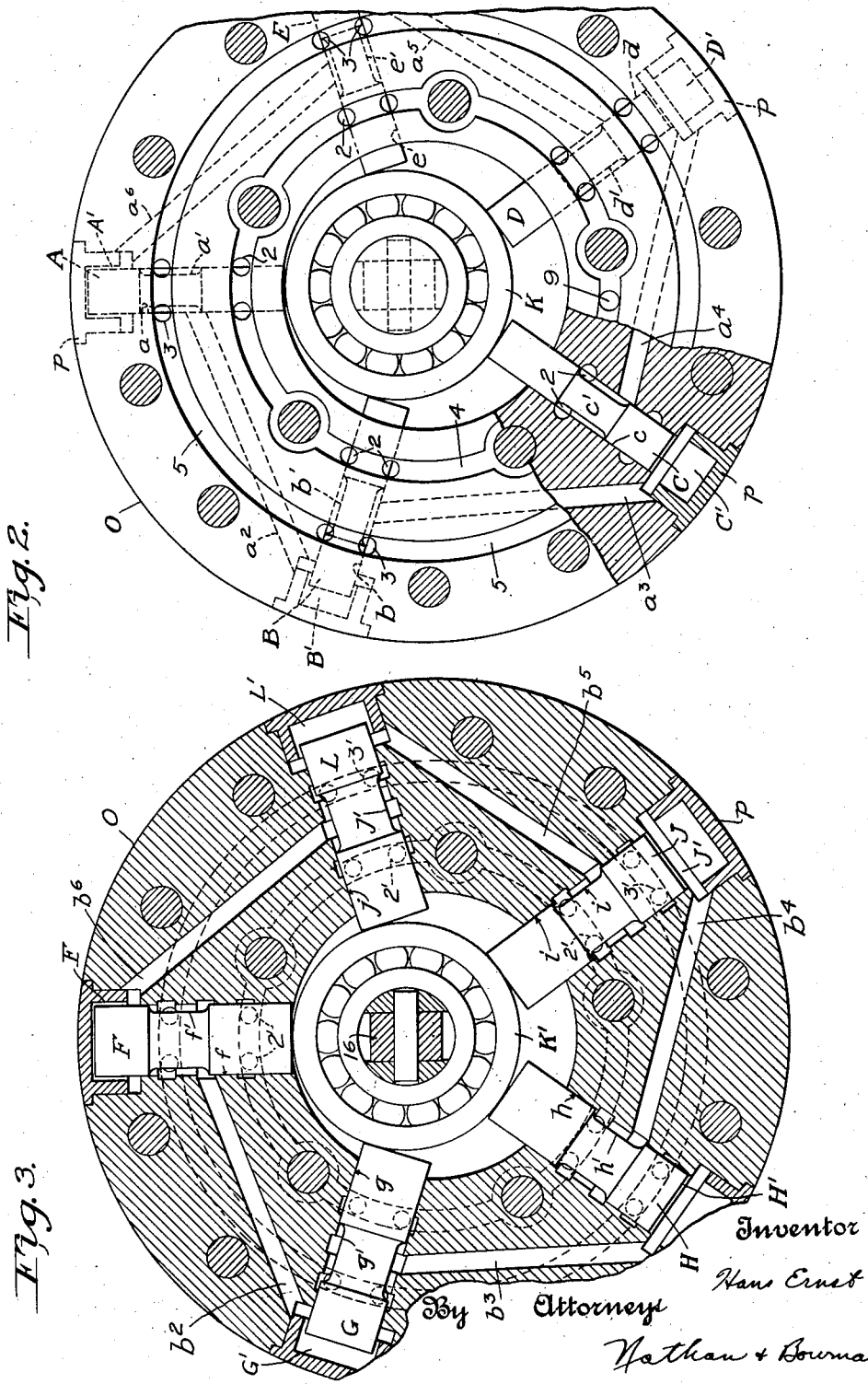

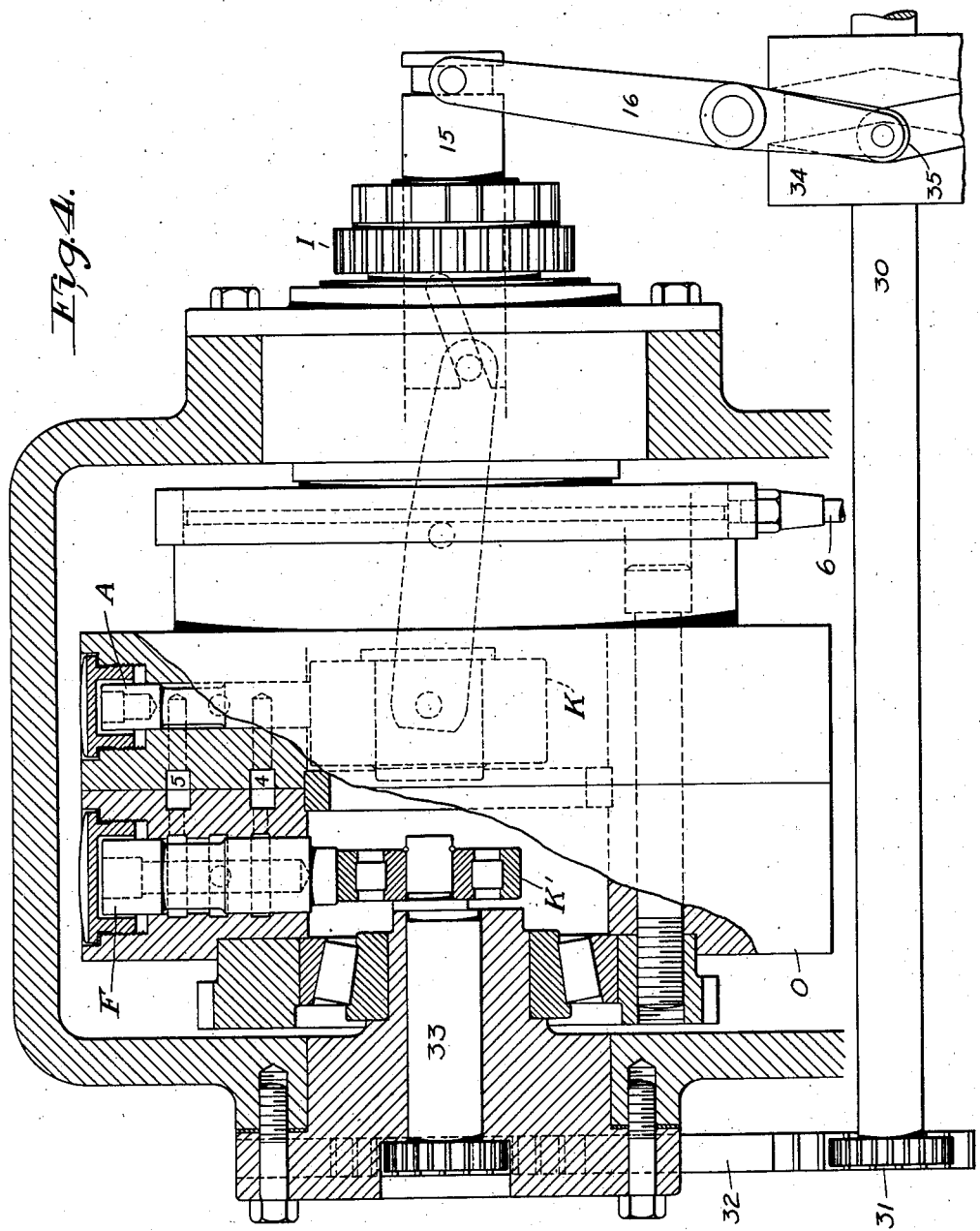

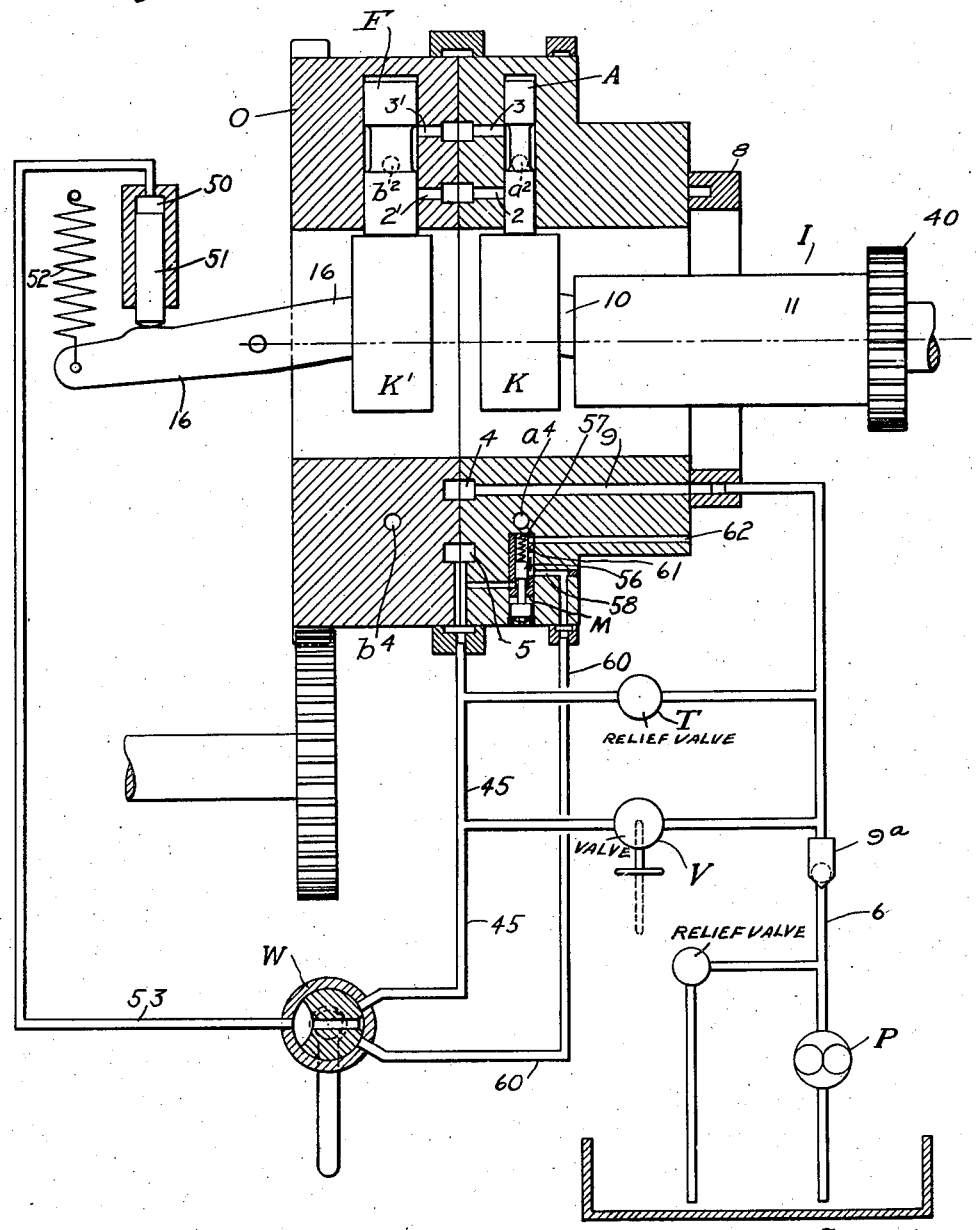

1,998,004

UNITED STATES PATENT OFFICE 1,998,004

DIFFERENTIAL HYDRAULIC SPEED GEAR

Hans Ernst, Cincinnati, Ohio, assignor to The Cincinnati Milling Machine Company, Cincinnati, Ohio, a corporation of Ohio Application May 23, 1930, Serial No. 454,916

14 Claims. (Cl. 60—53)

This invention concerns differential speed changing transmissions and particularly hydraulic transmissions of the reciprocating piston type wherein the power input or driving member is differentially coupled to a power output or driven member through a variable displacement hydraulic mechanism. It has for an object, the transferring into useful work, the entire potential energy of the fluid displaced by the pistons, whether the unit is running at high or low speeds.

A further object of this invention is to provide, in a hydraulic speed changing mechanism of the differential type, the equivalent of a directly coupled mechanical drive when running at full speed and thus attain a high percentage of overall efficiency.

A still further object is to provide a device capable of maintaining constant a predetermined speed ratio between driving and driven members, irrespective of whether the output load is a positive or negative quantity.

The device consists chiefly of a power input member and a power output member differentially coupled together. The input or driving member comprises a driving crank, cam, or eccentric arranged to impart a reciprocatory and angular motion to a series of plungers, herein termed pump pistons, movable in cylinders carried by a rotatable casing forming the output or driven member. Fluid is adapted to be supplied to the cylinders and the reciprocation of the pistons therein tends to cause a displacement of working fluid. If, however, there is no outlet for the fluid, the plungers cannot reciprocate and consequently the driving member transmits to the driven member an angular movement, the plungers, casing, and driving crank all rotating together and at the same speed. This locked condition provides the maximum speed of the driven member.

In order to vary the ratio between the driving and driven members, I provide a metering device for controlling volumetrically the rate at which the fluid may be discharged from the pump plungers, whereby the casing will be rotated at a slower rate. The metering device is in the form of a second series of plungers (called motor plungers or pistons for purposes of description only) arranged to receive the fluid displaced by the first group and later to discharge the same back to the intake of the first series for further circulation. The first series act as a pump supplying fluid under pressure to the second set which act in part as a meter to control the discharge from the first series of plungers and in part as a motor reacting against a stationary adjustable throw cam or crank to impose an additional force upon the member to be driven. If this stationary crank be set at zero, the "motor" pistons will not reciprocate as the casing is rotated therearound and the system is locked as above explained. Now, if a slight eccentricity be given to the stationary crank, the "motor" plungers, under the action of the fluid supplied by the "pump" pistons, will be permitted to reciprocate, as the casing turns and permit a predetermined amount of the working fluid to pass out of the high pressure line into the intake line and thus cause a slowing up or lagging behind of the casing or output member relative to the input member. As the stroke of the "motor" plungers is increased more fluid is metered out or permitted to escape from the "pump" cylinders and consequently the casing will run still slower. Thus, when no displacement takes place, the casing runs at full speed, the working fluid is under pressure and provides the equivalent of a direct coupled mechanical drive. This feature is one of the important differences between this unit and the conventional combinations of variable displacement pump and hydraulic motor, for in the latter constructions for all speed ratios, the power is transmitted from the driving to the driven member solely by means of the displacement of working fluid, whereas in the differential type disclosed herein, the volume of fluid displaced may vary from zero at full speed to a maximum at some slower speed.

Another distinguishing feature between this invention and the conventional types of transformers is that the potential energy of the compressed and displaced fluid is converted into useful work by the reaction of the "motor" pistons against the stationary crank and thereby assists in causing a rotation of the output member. In prior constructions, this energy is wasted or dissipated in heat as in such cases where the differential action is controlled by permitting the compressed fluid to escape through a pressure relief valve or other throttling means. The utilization of the heretofore wasted energy is of particular importance in slow output speeds in order to maintain a high percentage of mechanical efficiency.

As already explained, the speed ratio between the driving and the driven members may be changed from a 1 to 1 ratio to a lower value by varying the stroke of the "motor" plungers from zero to maximum and so control the volume of discharge from the "pump" pistons. The final ratio is also determined by both the stroke and diameter of the plungers. For the purpose of illustration merely the plungers shown on the annexed drawings are of unequal diameter. In cases where a still further reduction in speed is required, the driving crank or input member may also be constructed with a variable throw and thus by reducing the stroke of the "pump" plungers, the speed of the driven member will be reduced still further. Thus, if the stroke of the "pump" pistons be reduced to zero, there will be no displacement of working fluid, the output member remains stationary, and the driving member will run idly. Under these conditions the output member will remain stationary even though it be subjected to a negative output load.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a vertical sectional view through the gear unit illustrating the fluid connections between pump and motor and means for varying the eccentricity of the cams, whereby the speed of the output member may be varied. Fig. 2 is a sectional view along line 2—2 of Fig. 1 looking toward the driving end of the unit. Fig. 3 is a sectional view along the line 3—3 of Fig. 1, looking toward the driving end of the unit, and illustrating the radial arrangement of pistons and cylinders and the channelling between individual cylinders of the "motor" end of the unit. Fig. 4 is a view, partly in section, of a unit showing a modified form of mechanism for varying simultaneously the eccentricity of the "motor" cam and pump cam. Fig. 5 is a diagrammatic view of a modified form of the device.

Referring more particularly to Fig. 1, the unit comprises an input member or driving element, indicated generally as I, and an output or driven member indicated generally as O.

The driven member or casing O is rotatably journaled on bearings 23 and 25 and carries a first group of reciprocably mounted plungers A, B, C, D and E, in radially arranged bores $a$, $b$, $c$, $d$ and $e$, respectively, which are capped at their outer ends by suitable plugs $p$. Each of the plungers is formed, intermediate its ends with a reduced valve portion $a'$, $b'$, $c'$, $d'$, and $e'$, which is adapted at certain positions of the plunger to communicate first with intake ports 2 and then with exhaust ports 3. As shown in Figs. 1 and 2, all of the intake ports 2 communicate with a common conduit 4, the exhaust ports 3 are similarly connected to a common conduit 5. Each valve portion $a'$, $b'$, $c'$, etc., is also in constant communication with one of the work chambers A', B', C', D', and E', respectively, of the cylinders by means of conduits $a^2$, $a^3$, $a^4$, $a^5$, and $a^6$, to wit: valve portion $a'$, through conduit $a^2$ communicates with the chamber B'; valve portion $b'$ with chamber C'; valve portion $c'$ with chamber D' and so on, all of the valves being thus in communication with a related cylinder. These conduits $a^2$, $a^3$, $a^4$, etc., serve to convey fluid to, as well as from, its associated work chamber as later will be explained.

Fluid, preferably under low pressure is introduced into the system by a pipe line 6, thence through ports 7 of an annular stationary ring 8, through a conduit 9 to the common conduit 4 and periodically urges the respective pistons inwardly against a common driving cam. Referring to Fig. 1, it will be noted that the fluid pressure thus introduced into conduit 7, also acts against the rear face $8^a$ of the ring 8 and, assisted by springs $8^b$, holds the forward face of the ring tightly against the casing O.

Any suitable cam, eccentric or driving crank may serve as a power input member and provide a means for actuating the plungers. However, in the specific illustration on the drawings, an adjustable throw common actuator is provided, comprising a simple circular cam K pivotally supported at one end of a lever 10. It will be noted that rotary movement of the cam tends to move the plungers axially and angularly at inversely proportionate rates. If their axial movement is restricted the cam tends to move them angularly and thereby to rotate the driven member O. In order that the stroke of the plungers may be varied, the lever 10 is pivoted, intermediate its ends, to a sleeve member 11 rotatably journaled on bearings 24 and 26 concentric to the axis of the casing O, in the end wall of the unit housing 12.

The other end of the lever 10, carries a pin 13 adapted to be engaged by the walls of an angularly disposed slot 14 formed in an axially movable stub shaft 15. As shown by Fig. 1, movement of the stub shaft 15 axially, as by means of a lever 16, increases or decreases the length of the crank arm and thereby varies the throw of the cam K. In this manner, the stroke of the pistons, A, B, C, etc., and consequently the amount of fluid tending to be displaced thereby, may be varied as desired.

Rotary movement of the sleeve 11 and the eccentric K may be effected in a suitable manner, such as for example, a gear 40 forming part of the power input member I, and when thus rotated the cam imparts movements to the pistons as heretofore explained. If no outlet is provided for the fluid in the cylinders the unit becomes locked and the casing, pistons and driving crank all rotate together at the same speed. However, if the compressed working fluid is allowed to escape the pistons will reciprocate and the casing will "lag" behind the driving member. This invention proposes volumetrically to limit the escape of fluid whereby the casing will be rotated at a predetermined constant rate.

In the conventional forms to which reference has been made heretofore, the compressed fluid has been allowed to escape through pressure relief valves, etc., and dissipating in heat the entire potential energy of the compressed fluid. One of the objects of my invention is to utilize the potential energy of the compressed fluid and convert it to useful work by directing the fluid through a compounded motor and metering device which will now be described.

The output member O carries also a second set of pistons F, G, H, J and L, which may be called "motor" pistons and which are reciprocable in radial bores or cylinders $f$, $g$, $h$, $i$, and $j$, respectively. The "motor" pistons are formed similar to the "pump" pistons, that is, with valve portions $f'$, $g'$, $h'$, $i'$, and $j'$, which communicate at all times by means of ports $b^2$, $b^3$, $b^4$, $b^5$, and $b^6$, with work chambers F', G', H', J' and L', formed at the outer ends of the piston cylinders. The valve portions of the "motor" pistons are likewise adapted to be connected alternately with intake ports 3' and exhaust ports 2', which are in communication with the common conduits 5 and 4 already mentioned.

The motor pistons F, G, etc., are urged against a stationary adjustable throw cam K' by fluid delivered to the work chambers in a manner later to be explained. Relative rotary movement between the cam K' and the plunger carrying casing O permits motor plungers F, G, etc. to reciprocate, the length of stroke and consequently the amount of fluid received and discharged thereby per revolution of the casing being determined at all times by the amount of relative eccentricity between cam K' and carrier O.

The stationary cam K', common to all of the motor pistons, may be mounted similar to the mounting of the input cam member K, to wit, on a lever 16, which is pivoted at 17 to a sleeve member 18. The sleeve member 18 may be formed integral with the housing 12 or, as shown, made separately and non-rotatably secured thereto. Lever 16 carries a pin 19, which engages an angularly disposed slot 20 in a slidable shaft 21. Actuation of lever 22 controls the movement of shaft 21 to increase or decrease the effective throw of the cam K', which in turn controls the stroke of the "motor" pistons F, G, H, J and L, as above explained.

As the casing O is carried around the stationary cam K', the "motor" plungers on their inward movement receive the fluid from the discharging side of the "pump" cylinders and on their outward movement discharge the fluid into the intake side of the "pump" cylinders and thus a given quantity of fluid is kept in constant circulation. The system is, at all times, maintained filled, however, by means of an auxiliary pump P, diagrammatically illustrated in Fig. 5, which introduces fluid through the conduit 6.

Displacement of fluid by the "pump" plungers can occur only when there is a difference in speed between the driving crank and casing, the greater the displacement of the metering plungers, the greater will be the difference in speed between the driving crank and casing. If the speed of the input member be constant, the rate of rotation of the output member will be at a rate between maximum and zero depending both upon the diameters of the plungers and their permitted lengths of stroke. In other words, under all conditions the output member will rotate at such a speed that the volume of fluid displaced by the "pump" pistons per unit of time will equal the amount received and discharged by the "motor" plungers. Predetermined speed ratios are maintained even though the output load is negative, in which event the pump and motor functions are reversed and the normal return line becomes the high pressure line.

A check valve $9^a$ in the intake line 9, prevents a reversal of flow in the event that the pressure should rise in the return line.

Operation

Assuming for the purpose of this example that the input member is connected to a source of power and that the cam K is turning counter-clockwise, as viewed in Fig. 2. "Pump" piston A, under the action of fluid introduced into the work chamber A', is starting its inward stroke, slowly at first, and gradually accelerating its speed. Fluid, under low pressure, passes from conduit 4, through ports 2, around valve portion e', and then through channel $a^6$ to the work chamber A' where it acts upon the head of piston A to urge it against the moving cam K. During the slow movement of piston A, a preceding piston E is moving rapidly inwardly, the valve portion e' thereof closing off exhaust ports 3 and communicating with the intake ports 2. As the plunger A reaches the low point of cam K, the work chamber A' is completely filled with fluid, piston valve e' has closed off ports 2 and is opening communication with ports 3 connected to the high pressure conduit 5. Piston A is then forced outwardly by the cam K, expelling the fluid from the work chamber A', back through channel $a^6$ to valve e' and thence to the high pressure conduit 5. Meanwhile, plunger A acts as a control valve for piston B, piston B as a control valve for piston C, and so on around. It may here be explained that when using a simple uniform cam as herein disclosed, proper valve action is best obtained by selecting or grouping those plungers varying in phase angle nearest 90° or a quadrant of the cycle. In the specific illustration shown containing five units, the phase angle is 72°, with nine units 80°, four units 90°, etc. With the parts in the position shown in Fig. 2, the initial pressure acting upon the piston A is high pressure fluid from channel 5, ports 3, and conduit $a^6$. As piston E is moving rapidly inwardly at this period of the cycle, ports 3 are quickly closed off and low pressure ports 2 opened to chamber A', as above explained.

If no outlet for the fluid forced in the common conduit 5 is provided, the compressed fluid will lock the pistons against further reciprocation, and this condition causes the cam K to transmit a movement to the pistons transverse to the axes thereof and thereby turn the casing at a speed ratio of 1 to 1.

In order to reduce the 1 to 1 ratio to a lower value, the second series of plungers F, G, H, J and L, together with their associated conduits and ports, etc., are brought into operation as follows: Fluid discharged into the high pressure conduit 5 by the pump pistons, as heretofore explained, passes through ports 3', around the valve portions of the motor pistons, and taking for example a single unit, through conduits $b^6$ to the work chamber F' and urges the piston F against the eccentric K'. As eccentric K' is stationary and the casing or output member O is rotating with relative eccentricity thereabout, the motor plunger is moved inwardly. As the "motor" plunger F reaches the end of its inward stroke, its related valve plunger L closes off the ports 3' of the high pressure groove 5 and opens ports 2' connected with the intake conduit of the "pump" series. Meanwhile, "motor" piston L has started its inward stroke acting against the cam K' to impose a reactive driving force upon the casing. Thus it becomes apparent that the potential energy of the compressed fluid escaping from the work chambers of the "pump" cylinders is converted into work by its action upon the "motor" pistons.

Upon the upward or outward stroke of the motor piston F, the fluid contained in the work chamber is discharged back through conduit $b^6$ to valve portion j' of plunger L, which during this period of the cycle connects with ports 2' and channel 4; channel 4 being the intake conduit for the pump pistons A, B, C, D, and E.

The quantity of fluid displaced by the "pump" pistons, if the casing were stationary, may be determined by the formula $Ve = R \times N \times Sp \times A$ in which R represents the R. P. M. of the power input shaft; N=number of pump plungers; Sp=pump stroke in inches; and A=the area of pump plunger in square inches. Displacement of fluid by the "pump" plungers, however, can occur only when there exists a difference of speed between driving crank and the casing, thus the greater the displacement of fluid by the "motor" plungers for each revolution of the casing, the greater must be the difference in speed between the casing and driving crank. The actual volume $Va$ displaced by the pump pistons when the casing is running is, therefore, $$r \times N \times Sp \times A$$

in which $r$ represents the relative R. P. M., that is, input to output.

In a given case let it be assumed that the input member runs at 600 R. P. M. and it is desired that the output member runs at 400 R. P. M. The relative speed $(r)$ is, therefore, $R-R_0$ or 600 R. P. M.—400 R. P. M. In this case cam K is set to give a maximum stroke to the pump plungers which will thereby discharge a quantity of fluid $Va$. The stroke $(Sm)$ of the motor plungers necessary to give an output speed of $R_0$ may then be determined by the formula $$Sm = \frac{Va}{N_1 \times A_1 \times R_0}$$

where $N_1$=number of motor plungers and $A_1$=area of motor plungers, or in other terms $$Sm = \frac{r \times N \times Sp \times A}{N_1 \times A_1 \times R_0}.$$

As explained above, the speed ratio of driven member O to driving member I may be changed from 1 to 1 to a lower value by increasing the stroke of the motor plungers from zero to maximum, the final ratio being governed by both the stroke and diameter of these plungers. However, certain applications of this device may require still greater reductions in speed of the output member, relative to the input member, which may be obtained by reducing the stroke $(Sp)$ of the "pump" plungers, according to the equation $$Sp = \frac{Va}{N \times A \times r}.$$

In this way the speed of the driven member will still further be reduced. If the stroke of the driver I be reduced to zero, there will be no displacement of working fluid and consequently the driven member O will remain stationary while the driving member rotates idly.

For the majority of applications, a large reduction in speed ratio may be best obtained by first increasing the "motor" stroke from zero to maximum and then decreasing the "pump" stroke if necessary, but it is obvious that any other sequence may be followed to suit the requirements of the particular application.

Fig. 4 is illustrative of one form of a device for varying the effective throw of the eccentrics simultaneously, in which shaft 30 is adapted to be given a rotary movement by suitable mechanism (not shown). One end of the shaft 30 has a rack and pinion connection 31 with a slidable bar 32 the opposite end of which is similarly connected with the outer end of the normally stationary adjustable throw crank 33. The axis of crank 33, it will be noted, is laterally offset in respect to the axis of the input member I so that on its rotation its eccentric terminal stud K' is shifted toward or from axial alignment with the member K, and thus the relative eccentricity varied. The control rod 30 also carries a barrel cam 34, the cam groove of which is tracked by a roller 35 mounted at one end of lever 16. Obviously, the cam groove may be contoured to give any particular cycle of movements to the lever 16, whereby the stroke of the piston plungers may be varied to suit the requirements of the work at hand.

The unit, illustrated by Fig. 4, is in other respects similar to the unit already described and detailed description thereof, is deemed unnecessary. Suffice it to say, that similar parts of the mechanism in all of the drawings are indicated by the same reference characters.

As a further refinement of this invention, to bring the casing member O to a standstill without disturbing the settings of the respective cams, it is proposed to arrange for a discharge of fluid from the normal high pressure conduit. Fig. 5 illustrates diagrammatically how this may be effected, in which V represents a valve in the line 45 suitably connected to the conduit 5. As illustrated, the valve V is adapted to be actuated and when fully opened affords a by-pass for the fluid discharged by the pump pistons, consequently, the output member comes to rest. If the valve V be actuated so as to gradually cut off the discharge of fluid a throttling effect is produced, which picks up the load gradually without jarring or sudden straining of the parts. And conversely if the valve V be gradually opened, the casing will be driven at a decelerating rate until a predetermined speed or zero speed is reached.

Speed ratio may be automatically controlled either directly in relation to torque alone or by the combined effect of torque and speed, by providing a pressure actuated throw adjusting means, such for example, as illustrated in Fig. 5. In this automatic construction, the pressure fluid in conduit 5 is connectible through valve W and line 53 to the cam stroke control cylinder 50, and which acting upon the piston 51 in opposition to the spring 52, adjusts the eccentric K' away from its neutral position and thus the speed ratio varied in accordance with variations in torque load to which the unit may be subjected.

When the unit is applied as an automobile transmission, it is desirable that the automatic speed ratio control be governed in relation to torque and speed. This may be accomplished by the utilization of a centrifugal valve M which is "cut in" the circuit by the selector valve W and tends normally to prevent the high pressure fluid in conduit 5 from reaching the control cylinder 50. Under normal conditions of operation the speed ratio will not vary; however, when the pressure rises in conduit 5 due to an increase in the load upon the driven member, and/or a slowing up of the casing O, the increase in pressure acting upon the underside of piston 56 of the valve M overcomes the spring 57 and the centrifugal force of the piston 56 and opens conduit 5 to ports 58, line 60, valve W, and line 53 to the control cylinder 50. Pressure fluid thus directed to the control cylinder 50 actuates the piston 51 to shift lever 16 and cam K' further away from its neutral position, which as heretofore explained, increases the discharge of the "motor" pistons and reduces the speed of the driven member.

It will be apparent, therefore, that the greater the speed of the driven member O. the greater must be the pressure in conduit 5 in order to overcome the combined effect of spring 57 and the centrifugal force of valve piston 56 to permit pressure fluid to pass through ports 58 and to the control cylinder 50. When the valve piston 56 closes off port 58 and conduit 5, the drain from the control cylinder 50 passes back through line 53, valve W, line 60, port 58, chamber 61 above the valve piston 56, to line 62 to the reservoir.

In other applications of this invention, it may be desirable to limit definitely the maximum torque which may be transmitted through the unit. This may be readily effected by the insertion of a fluid pressure relief valve T in the circuit between the high pressure and low pressure conduits. Thus, when the pressure in the high pressure conduit rises to a predetermined maximum by reason of an unusual load being placed upon the output member or the parts driven thereby, the valve T will open automatically and short-circuit the fluid back to the low pressure conduit, or, if desired, to auxiliary hydraulically actuated mechanism. Obviously, the valve T may be provided with actuating means for relieving the pressure at will and in this event, the valve V and its immediate connections may be dispensed with.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. The combination of the character described including a rotatably mounted casing member adapted to be driven; cylinders within said casing, each providing a work chamber and valve means; plungers reciprocable within said cylinders and each provided with a head portion and a valve portion; a system of channels provided by said casing for conveying fluid to and from said work chambers through and under the control of said valve portions; intake and exhaust ports for conveying fluid to and from the work chambers and valve portions of said cylinders; a rotatable actuating member having a peripheral driving portion common to all of said plungers adapted cyclically to reciprocate said plungers and simultaneously tend to move them about the axis of said actuator; said plungers having an abutting contact with the peripheral portion of said actuator; and means for controlling volumetrically the discharge of fluid from said work chambers thereby to effect relative movement between said rotatable casing and said actuating member.

2. An engine combining a rotatable casing member provided with two groups of plungers and complemental cylinders; a rotatable plunger-actuating member common to one of said groups of plungers; a stationary member common to the plungers of the other of said groups; said rotatable casing means providing a conduit system adapted to convey fluid to and from the cylinders of the said two groups of plungers, and providing also a supply conduit normally connected with an external source of fluid pressure supply; means normally maintaining said external source of fluid supply connected with the said supply conduit formed in said rotatable casing; means actuated by said rotatable actuator tending simultaneously to rotate said casing and to reciprocate one group of plungers to displace fluid under pressure to the other group, means actuated by the relative movement between said casing and said stationary member to control the movement of the group of receiving plungers thereby to control volumetrically the rate of discharge of fluid from said first group of plungers whereby the speed of relative movement between said casing and said actuator may be maintained at a predetermined rate; and a check valve to prevent a reverse flow of fluid through said supply fluid conduit.

3. The combination of the character described including a rotatable casing member; cylinders within said casing, each provided with a work chamber and valve means; plungers reciprocable within said cylinders and each provided with a head portion and a valve portion; a conduit system having intake and exhaust ports for conveying fluid to and from the work chambers and valve portions of said cylinders, and so arranged that the fluid passing to and from the work chambers passes through and under the control of the valve portions of related plungers; a plunger-actuating member having a peripheral driving portion common to all of said plungers whereby relative movement between said members is adapted simultaneously to reciprocate cyclically said plungers axially to discharge fluid from the cylinders and to move them transversely to their axes to rotate said casing, said plungers having an abutting contact with the peripheral portion of said actuating member; and means for controlling volumetrically the discharge of fluid from said work chambers thereby to effect a relative movement between said rotatable casing and said actuating member.

4. A mechanism of the nature disclosed combining a rotatable casing member provided with two groups of cylinders; pistons carried in said cylinders; a conduit system adapted to convey fluid to and from said cylinders; a variable throw driving cam arranged to impart a reciprocatory motion to one group of pistons to cause a displacement of fluid from one group of cylinders; means including a variable throw stationary cam and a second group of pistons carried by said casing and arranged to be actuated by the fluid discharged by said first group to impose a force against said stationary member to create a reactive force upon said casing member and to drive the same; and means to vary the effective throw of either of said cams independently, including a pivotally mounted support for each of said cams and selectively operable devices for oscillating said supports.

5. A mechanism of the nature disclosed combining a rotatable casing member provided with two groups of cylinders; pistons carried in said cylinders; a conduit system adapted to convey fluid to and from said cylinders; a variable throw driving cam arranged to impart a reciprocatory motion to one group of pistons to cause a displacement of fluid from one group of cylinders; means including a variable throw stationary cam and a second group of pistons carried by said casing and arranged to be actuated by the fluid discharged by said first group to impose a force against said stationary member to create a reactive force upon said casing member and to drive the same; and means including a pivotally mounted support for one of said cams and an eccentrically mounted support for the other of said cams, and means operatively associated with each of said supports and adapted when actuated simultaneously to vary the effective throw of both of said cams.

6. A power transmission combining a member adapted to be driven; a driving member; plungers operatively engaging each of said members and adapted to transmit motion from one to the other at variable rates; means for varying the effectiveness of said driving engagement, said means comprising a closed system of channels providing intake and exhaust conduits for said plungers, a main supply conduit connected with an external source of supply fluid communicating with said intake conduits continuously maintaining therein a pressure higher than one atmosphere, a fluid control valve for controlling the flow between the intake and exhaust conduits of said closed system, and a check valve in the supply conduit to prevent overrunning of the output member.

7. An engine combining a rotatable casing provided with two groups of plungers and complemental cylinders; a variable throw rotatable plunger-actuating member common to one of said groups of plungers; a stationary variable throw member common to the plungers of the other of said groups; means to vary the throw of either of said members; said casing means providing a conduit system adapted to convey fluid to and from the cylinders of the said two groups of plungers, and providing also a conduit system for supply fluid; means actuated by said rotatable actuator tending simultaneously to rotate said casing and to reciprocate one group of plungers to displace fluid under pressure to the other group; means actuated by the relative movement between said casing and said stationary member to control the movement of the group of receiving plungers thereby to control volumetrically the rate of discharge of fluid from said first group of plungers whereby the relative speed between said casing and said actuator may be maintained at a predetermined rate; and a check valve in the supply line to prevent overrunning of the casing member.

8. In a device of the character described combining a variable throw input member; an output member adapted to be driven therefrom; hydraulically controlled means for driving said output member, said means combining a series of plungers reciprocably mounted in cylinders carried by one of said members and actuated by said input member, said input member acting simultaneously to reciprocate said plungers, thereby to discharge fluid from the cylinders and to move the plungers about the axis of the input member; intake and exhaust ports for said cylinders; an adjustable metering device for contolling volumetrically the rate of discharge from said cylinders whereby the potential energy of the compressed fluid creates an opposing force upon said input member causing the latter to impart a rotary movement to said output member at a predetermined rate; and means to vary the speed ratio between the output and input member independently of the setting of the metering device, said last named means including a pivotal support for said input member and mechanism for oscillating same.

9. In a device of the character described combining, a constant speed rotatable input member and a rotatable output member adapted to be driven therefrom; means to create a relative movement between said members, said means comprising two series of plungers reciprocably mounted in cylinders carried by said output member, one of said series of plungers being adapted to be actuated by said input member axially and angularly at inversely proportionate rates, a stationary member common to said other series of plungers, a system of conduits provided by said output member and so arranged that the discharge conduit of one of said series provides the intake of the other series of plungers; means to vary the stroke of said plungers of the first series thereby to vary the quantity of fluid discharged and received thereby per unit of time; and means for varying the amount of fluid received by said second series independently of the stroke varying means of the first series, comprising a pivotally mounted support for said stationary member and mechanism for oscillating same.

10. A hydraulic power transmission combining a rotatably mounted casing member provided with a plurality of radially arranged cylinders, said cylinders being also arranged in a single plane transverse to the axis of rotation of said casing; a plunger element reciprocably mounted in each of said cylinders, each of said plungers being provided with a valve portion which acts as a valve for a related plunger and cylinder; a driving element, comprising a cam having a driving portion common to all of said plungers and adapted successively to move the plungers radially outwardly, said plungers having an abutting engagement with said element; a conduit system closed to any exhaust provided by said casing member having intake and exhaust channels for said cylinders; hydraulic means continuously operative to maintain said plungers in contact with the driving portion of said cam; and means for controlling volumetrically the rate of discharge from said cylinders thereby to control the rate of relative movement between said driving element and casing and for stopping all discharge from said cylinders thereby to lock said casing positively with said driving element.

11. A hydraulic power transmission combining a rotatably mounted casing member adapted to be driven; a plurality of radially arranged cylinder bores formed in said casing, said cylinder bores being also arranged in a single plane transverse to the axis of said casing; a plunger element reciprocably mounted in each of said cylinders; a driving element having a driving portion thereof common to and having an abutting contact with all of said plungers adapted successively to move the plungers radially outwardly and simultaneously tending to move the plungers and casing member angularly; a conduit system providing intake and exhaust channels for said cylinders; hydraulic means for maintaining said plungers in engagement with the driving portion of said driving element; and means for controlling volumetrically the rate of discharge from said cylinders thereby to control the rate of movement imparted to said casing member.

12. A hydraulic power transmission combining a rotatably mounted driven member provided with two series of radially arranged cylinders, the cylinders of each series being arranged in a single plane transverse to the axis of said member; a plunger element reciprocably mounted in each of said cylinders; a driving element having a driving portion common to all of the plungers of one of said series tending to move the plungers simultaneously radially outwardly and angularly; a conduit system in said driven member providing intake and discharge channels for said series of cylinders, the discharge channel for one of said series of cylinders being the intake of said other series of cylinders; hydraulic means for maintaining the plungers of one of said series of cylinders in contact with the driving portion of said driving element; a stationary element engageable by the plungers of the other of said series of cylinders for controlling the quantity of fluid received and discharged thereby per revolution of said driven member; and means for short circuiting the fluid in said conduit system when the torque on said driven member exceeds a predetermined value.

13. A hydraulic transmission combining a fluid pump unit and a fluid motor unit, each of said units having radially disposed pistons and cylinders therefor arranged to receive the fluid discharged by the other unit through a system of channels closed to any exhaust, each of said pistons and cylinders being provided with valve means serving to control the flow to and from related cylinders; positive means for moving the pistons radially in one direction, and hydraulic means for moving the pistons radially in the opposite direction, a fluid supply line and means including a continuously operative auxiliary pump for injecting make-up fluid to the intake side of said pump unit under a predetermined constant pressure; and means to vary the receiving and discharging capacity of one of said units to cause said motor unit to be driven at a preselected rate.

14. In a power transmitting device having a pump unit and a motor unit adapted to be driven by the fluid discharged by said pump, each of said units comprising a series of radially arranged pistons and cylinders; positive acting driving means for effecting relative movement between the said pistons and cylinders of the pump unit in one direction thereby causing pumping action and hydraulic means for effecting relative movement between said pump pistons and cylinders in the reverse direction; a system of fluid conduits connecting said pump and motor units comprising a high pressure conduit adapted to convey pump discharge fluid to the intake side of said motor and a low pressure conduit adapted to convey the fluid exhausted by said motor to the intake side of said pump, the combination of means for varying the effective stroke of the pistons of one of said units whereby said motor may be driven at various predetermined speeds including a cylinder and a fluid actuated piston element for actuating said stroke varying means; branch conduits connected with said high pressure conduit adapted to convey high pressure fluid to said cylinder to actuate said piston element; fluid control means in one of said branch conduits for regulating the flow therein, including a piston valve element responsive automatically to the combined influence of torque and speed of said motor; and valve means selectively operable to connect either of said branch conduits with said stroke varying piston and cylinder.

HANS ERNST.